United States Patent [19]

Nakamura

[11] Patent Number: 5,678,056
[45] Date of Patent: Oct. 14, 1997

[54] METHOD AND APPARATUS FOR CONTROL OF SERIAL COMMUNICATION BY CHANGING ADDRESS CONDITIONS DURING AND AFTER COMMUNICATION START UP

[75] Inventor: Ikuya Nakamura, Tokyo, Japan

[73] Assignee: NEC Corporation, Tokyo, Japan

[21] Appl. No.: 395,091

[22] Filed: Feb. 27, 1995

[51] Int. Cl.[6] .................................................. G06F 15/00
[52] U.S. Cl. ................ 395/800; 395/182.11; 395/200.2; 395/829; 379/269; 370/227; 370/400; 340/825.5
[58] Field of Search .............................. 395/800, 182.11, 395/200.2, 829; 370/400, 227; 340/825.5; 379/269

[56] References Cited

U.S. PATENT DOCUMENTS

| | | | |
|---|---|---|---|
| 4,736,409 | 4/1988 | Hasegawa et al. | 379/269 |
| 4,739,321 | 4/1988 | Friedman et al. | 340/825.5 |
| 4,930,118 | 5/1990 | Sugihara | 370/227 |
| 5,138,615 | 8/1992 | Lamport et al. | 370/400 |
| 5,247,692 | 9/1993 | Fujimura | 395/800 |

Primary Examiner—Alyssa H. Bowler
Assistant Examiner—John Follansbee
Attorney, Agent, or Firm—Sughrue, Mion, Zinn, Macpeak and Seas

[57] ABSTRACT

In a serial communication control device comprising first active and second reserved function blocks and a CPU section for delivering to the function blocks a serial datum comprising an address and a data value, an address giving arrangement gives a common value as the address value to the first and the second function blocks upon start up of the serial datum and first and second unique values as the address values to the first and the second function blocks after the start up to make the function blocks produce the data value corresponding to the address values coincident with the common or one of the first and the second unique values. Preferably, the second function block comprises an address selector in which the common value is set and which is quiescent to the first unique value given to the first function block after the start up. The common value may be identical with the first unique value during the build up.

14 Claims, 2 Drawing Sheets

| ADDRESS PART | DATA PART |

METHOD AND APPARATUS FOR CONTROL OF SERIAL COMMUNICATION BY CHANGING ADDRESS CONDITIONS DURING AND AFTER COMMUNICATION START UP

BACKGROUND OF THE INVENTION

This invention relates to control of serial communication in a communication apparatus comprising a CPU section for setting a data value of a serial datum in function blocks of the communication apparatus and, more particularly, to a method and an apparatus for controlling serial communication.

In the serial communication control device in general, the CPU section delivers the serial data to function blocks. The serial data is given a format comprising a data part of a data value and an address part of an address value corresponding to the data part. To deliver such data parts to the function blocks, the CPU section gives an identification value to the address value for each data part. In a conventional serial communication control device, these identification values are unique to each the function block. Each function block deals with the data values supplied thereto to proceed with functions of the communication apparatus.

Typically, the function blocks are provided in redundancy to comprise first active and second reserved function blocks in the manner which will later be described in greater detail. Even when a single data value should be processed, the CPU section gives two separate identification values to the address value in order to deliver the single data value in two different packets to the first and the second function blocks.

Upon start up of the serial communication, either when the operation of the serial communication control device starts or when a power source of the serial communication control device is restored from an outage, the first and the second function blocks must be put into operation with a data value supplied to each function block. As a result, it takes an appreciably long processing time to start up the serial communication.

SUMMARY OF THE INVENTION

It is an object of the present invention to provide a serial communication control method with a reduced processing time to start up serial communication.

It is another object of this invention to provide a serial communication control device operable with a reduced processing time to start up of serial communication.

Other objects of this invention will become clear as the description proceeds.

In accordance with an aspect of this invention, there is provided a serial communication control method to serial communication of serial datum of a format comprising an address part of an address value and a data part of a data value by delivering the serial datum from a CPU section to first and second function blocks when the address value coincides with a predetermined value, which serial communication method comprises the steps of (A) giving a common value to the address value of the address part for the first and the second function blocks upon build up of the serial datum; (B) assigning first and second unique values to the first and the second function blocks after build up of the serial datum; and (C) making the CPU section deliver the serial datum to the first and the second function blocks with the address value of the address part given the common value and one of the first and the second unique values upon and after build up of the serial datum, respectively.

In accordance with a different aspect of this invention, there is provided a serial communication control device comprising first and second function blocks and a CPU section for delivering to the first and the second function blocks a serial datum of a format comprising an address part of an address value and a data part of a data value, each of the first and the second function blocks receiving the data value for control of serial communication when the address value coincides with a predetermined value, wherein the predetermined value is given a common value for the first and the second function blocks to start up of the serial communication control device, the first and the second function blocks comprising address setting means for assigning first and unique values to the first and the second function blocks after start up of the serial communication control device, the CPU section delivering the serial datum to the first and the second function blocks with the predetermined value given the common value and one of the first and the second unique values upon and after start up of the serial communication control device, respectively.

DESCRIPTION OF THE PREFERRED EMBODIMENT

Figures 1, 2:
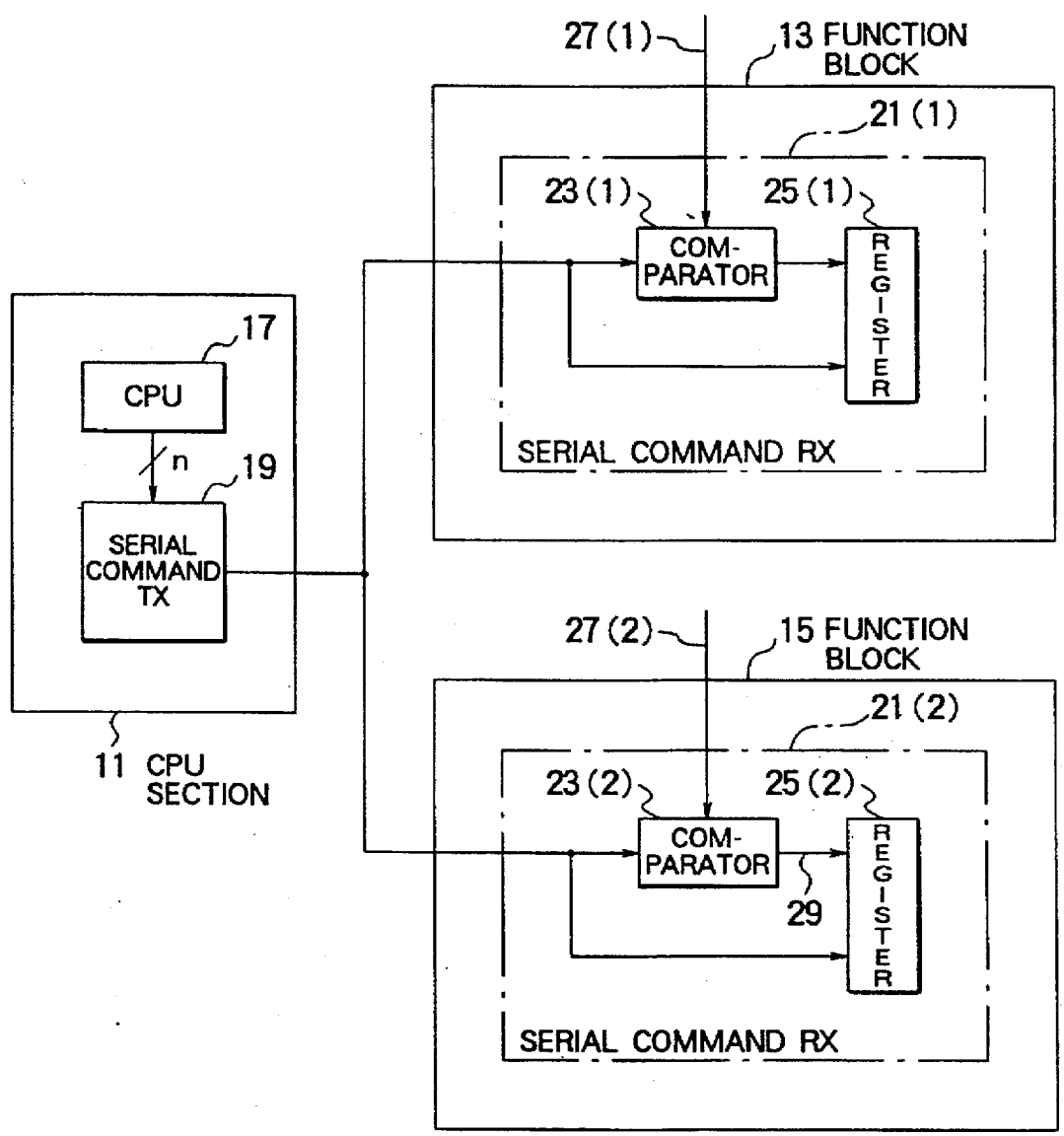
FIG. 1 is a block diagram of a conventional serial communication control device.
FIG. 2 shows a format of serial datum processed in a serial communication control device in general.

Referring to FIG. 1, a conventional serial communication control device will first be described in order to facilitate an understanding of the present invention. The serial communication control device comprises a CPU section 11, a first function block 13 as an acting function block, and a second function block 15 which is similar in structure to the first function block 13 to serve as a reserved function block.

The CPU section 11 comprises a CPU 17 and a serial command transmitter 19. The first function block 13 comprises a first serial command receiver 21(1) comprising, in turn, a first comparator 23(1) and a first register 25(1). The second function block 15 comprises a second serial command receiver 21(2) comprising, in turn, a second comparator 23(2) and a second register 25(2).

The first and the second function blocks 13 and 15 are for processing various data values supplied from the CPU section 11 as serial data of serial communication. The data values are processed in the first and the second function blocks 13 and 15 to proceed with functions of a communication apparatus comprising the serial communication control device.

Turning to FIG. 2, the serial datum serves as a serial command of n parallel bits, where n represents a predetermined integer. For use in a serial communication control device in general, the serial datum is given a format which comprises an address part and a data part in correspondence to the address part. Such data parts are given the various data values. Each address part is given an address value or number. Such address values are individual or unique to the data values.

Turning back to FIG. 1, the CPU 17 sends the data parts of the various data values to the serial command transmitter 19 by individually giving the address values to the address parts corresponding to the data parts in accordance with the data values. The serial command transmitter 19 delivers such serial data to the first and the second function blocks 13 and 15. The first and the second serial command receivers 21 (the suffixes (1) and (2) omitted) receive the serial data and read the address and the data parts.

On sending the serial data to the serial command transmitter 19, the CPU 17 adds a first and a second unique value to the address parts of the serial data which should be processed by the first and the second function blocks 13 and 15, respectively. The first and the second comparators 23 (the suffixes (1) and (2) omitted) identify the first and the second unique values, respectively, to store in the first and the second registers 25 (the suffixes (1) and (2) omitted) the data values of the serial data which are actually directed to the first and the second function blocks 13 and 15, respectively. For this purpose, the first and the second comparators 23 are supplied with the first and the second unique values through first and second address supply leads 27(1) and 27(2), respectively. In compliance with the address values of the serial data and the data values stored in the first and the second registers 25, the first and the second function blocks 13 and 15 deal with the serial data.

Upon start up of the serial data or of the serial communication control device, namely, when a power source of the communication apparatus is either newly switched on or recovered from an outage, the serial communication device must be put into operation by making the CPU section 11 send serial data to both the first and the second function blocks 13 and 15 to make the first and the second function blocks 13 and 15 operational. As a consequence, it has taken an appreciably long processing time on start up of the serial communication.

Figure 3:
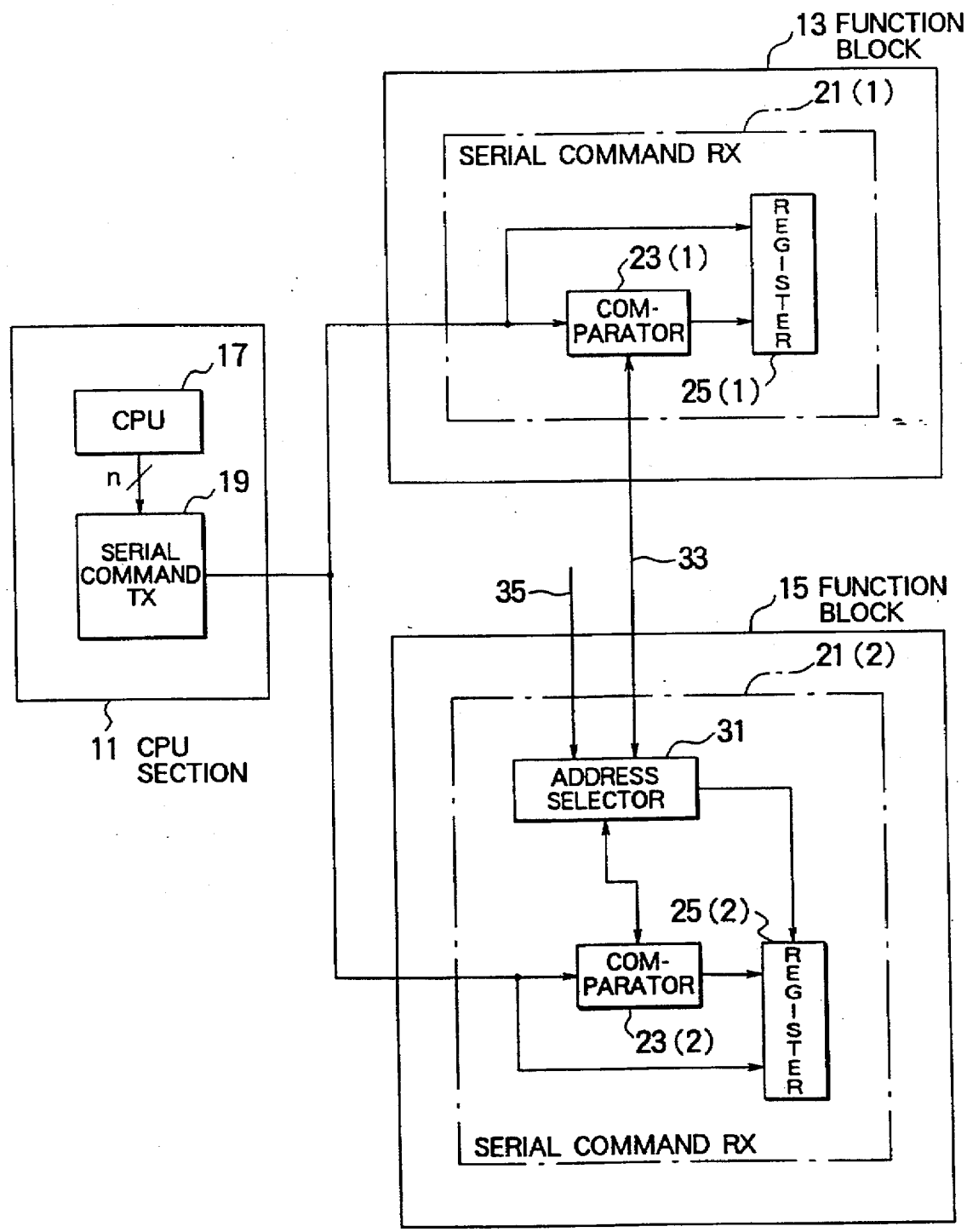
FIG. 3 is a block diagram of a serial communication control device according to an embodiment of the instant invention.

Referring now to FIG. 3, the description will proceed to a serial communication control device according to a preferred embodiment of this invention. Similar parts are designated by like reference numerals and are similarly operable with likewise named signals. The serial communication control device deals with the serial data of a format illustrated with reference to FIG. 2.

The first and the second function blocks 13 and 15 are hardware blocks like in FIG. 1. It is presumed that the first and the second function blocks 13 and 15 are active and reserved function blocks, respectively. For delivery to the first and the second serial command receivers 21, the CPU 17 gives a common value to each address part of the serial data upon or during start up of the serial data. First and second unique values are given to each address part of the serial data when the serial data should be received by the first and the second serial command receivers 21, respectively after start up of the serial data is completed. The first unique value is different from the second unique value, and are assigned to the first and the second function blocks 13 and 15, respectively.

In the first function block 13, the first serial command receiver 21(1) comprises the first comparator 23(1) and the first register 25(1). In addition to the second comparator 23(2) and the second register 25(2), the second serial command receiver 21(2) comprises an address selector 31 connected to the second comparator 23(2) and to the second register 25(2). Like in FIG. 1, the first comparator 23(1) is preliminarily rendered responsive to the first unique value.

In the serial communication control device being illustrated, an address supply lead 33 is connected to the first comparator 23(1) and to the address selector 31 to supply the common value to the first comparator 23(1) and to the address selector 31 during start up of the serial data. A reservation address supply lead 35 is connected to the address selector 31 to supply the second unique values to the address selector 31 when the first function block 13 is subjected to a fault or failure.

In cooperation with the CPU 17, the acting address supply lead 33 serves as an address giving arrangement for giving the common value to the first comparator 23(1) and to the address selector 31 and consequently to the first and the second function blocks 13 and 15 upon or during start up of the serial datum or data. In cooperation with the first unique value preliminarily set in the first comparator 23(1) and also with the CPU 17 and in cooperation with the address selector 31 supplied with the second unique value and with also the CPU 17, the reservation address supply lead 35 serves as an address setting arrangement in the first and the second function blocks 13 and 15 for assigning the first and the second unique values to the first and the second function blocks 13 and 15 after start up of the serial datum or data. Through the address selector 31, the common and the second unique values are set in the second comparator 23(2) upon and after start up of the serial data.

In the manner described above, the serial data are delivered from the CPU section 11 to the first and the second function blocks 13 and 15 with an indication of the common value in the address part or parts during start up. While the first function block 13 is subjected to no failures, the serial data are delivered to the first and the second function blocks 13 and 15 with a different indication of the first unique value in each address part. When a failure takes place in the first function block 13, the CPU 17 is informed of this fact to switch each first unique value to the second unique value. The serial data are therefore delivered to the first and the second function blocks 13 and 15 with an indication of only the second unique value in each address part.

Upon start up of the serial data, the first and the second comparators 23 respond to the common value. Responsive to the common value, the second comparator 23(2) stores in the second register 25(2) through the address selector 31 the data value or values of the data parts corresponding to the address parts of the common value. In this manner, use of only one packet is sufficient to put the first and the second function blocks 13 and 15 into operation.

Supplied through the reservation address supply lead 35 after start up of the serial data, the second unique value or values are set in the second comparator 23(2) through the address selector 31 in the manner described above. While the first function block 13 is operable in response to the first unique value, the second comparator 23(2) is quiescent. When a failure takes place in the first function block 13, the CPU section 11 delivers to the first and the second function blocks 13 and 15 the serial data with the second unique values to put the second comparator 23(2) in operation for storing in the second register 25(2) through the address selector 31 the data values of the data parts corresponding to the address parts of the second unique values.

In the example illustrated, the common value is equal either to one of the first unique values or to a value which is predetermined. In this event, the first function block 13 always responds to the first unique value to be duly operable unless a failure takes place therein. The second function block 15 responds to the common value during start up and to the second unique values only during presence of a failure in the first function block 13.

In any event, the first and the second function blocks 13 and 15 are operable to proceed with operation of the communication apparatus in accordance with the data values of the data parts corresponding to the address parts of the address values to which the first and the second function blocks 13 and 15 are selectively responsive. For example, it will be assumed that the communication apparatus is a cross-connect apparatus. Stored in one of the first and the second registers 25 depending on the circumstances, the data values are used to establish accordingly preselected cross connections. When the communication apparatus is a terminal equipment, the data values are used to deal with encoding and/or decoding in the appropriate manner.

It is possible to preliminarily set the second unique value in the second comparator 23(2) with the connection lead 29 and with the serial data delivered also to the address selector 31 preliminarily rendered responsive to the common value. The acting and the reservation address supply leads 33 and 35 are unnecessary. Under these circumstances, the CPU 17 serves as the address giving arrangement in cooperation with the first comparator 23(1) and the address selector 31 and as the address setting arrangement in cooperation with the first and the second comparators 23.

In the illustrated serial communication control device, the first comparator 23(1) the second comparator 23(2), and the address selector 31 serve as an address holding arrangement. The address giving arrangement keeps the common value in the address holding arrangement upon start up of the serial data. The address setting arrangement keeps the first and the second unique values in the address holding arrangement after start up of the serial data.

As described, the common value is preferably either the first unique value or a specific part or value which is predetermined. At any rate, the address selector 31 rejects the address part of different values other than the first unique value.

The serial communication control device may comprise a plurality of reserved function blocks, with third and other unique values preassigned to such reserved function blocks.

It is often the case as upon start up of the serial data to store a common data value in the registers 25 of the acting and the reserved function blocks.

It is possible, with this invention, to reduce the number of serial data delivered in the serial communication control device from the CPU section 11 to achieve a short start up time of the serial data and the serial communication control device.

While this invention has thus far been described in specific conjunction the embodiments described, it will be readily possible for one skilled in the art to put this invention into effect in various other manners. For example, it is possible to format each address part parallel to the data part corresponding to the address part.

What is claimed is:

1. A serial communication control method for transmitting serial data from a CPU to at least one of: a first function block and a second function block, wherein each of said first and second function blocks is responsive to an address value in said serial data, said method comprising the steps of:
assigning a common value as the address value to which said first and second function blocks is responsive during a start up period of transmission of serial data;
assigning a first and second unique value as the address value to which said first and second function blocks, respectively, are responsive after said start up period is complete; and
delivering serial data with said common value during said start up period and delivering serial data with at least one of said first and second unique values after said start up period is complete.

2. A serial communication control method as claimed in claim 1, wherein said common value is equal to one of said first and said second unique values.

3. A serial communication control method as claimed in claim 2, wherein said first function block is an active function block said second function block is a reserved function block, and said common value is equal to said first unique value.

4. A serial communication method as claimed in claim 1, wherein said first function block is an active function block and said second function block is a reserved function block and said common value is equal to said first unique value.

5. A serial communication method as claimed in claim 1, wherein said first function block is an active function block and said second function block is a reserved function block wherein said first function block is responsive to said first unique value when said first function block is operable and said second function block is responsive to said second unique value when said first function block is not operable.

6. A serial communication control apparatus for transmitting serial data comprising:
first and second function blocks, wherein each of said first and second function blocks is responsive to an address value in said serial data;
a CPU section for delivering serial data to said first and said second function blocks;
an address setting means responsive to said CPU section for assigning first and second unique address values to which said first and said second function blocks are respectively responsive after start up of said serial communication control device,
wherein said CPU section delivers serial data to said first and said second function blocks using a common address value during start up of said serial communication apparatus and said CPU delivers serial data to said first and second function blocks using one of said first and said second unique address values after start up of said serial communication control apparatus.

7. A serial communication control apparatus as claimed in claim 6, wherein said common address value is equal to one of said first and said second unique values address.

8. A serial communication control apparatus as claimed in claim 7, wherein said first function block is an active function block and said second function block is a reserved function block and said common address value is equal to said first unique address value.

9. A serial communication control apparatus as claimed in claim 6, wherein said first function block is an active function block and said second function block is a reserved function block and said common address value is equal to said first unique address value.

10. A serial communication control device as claimed in claim 6, wherein said first function block is an active function block and said second function block is a reserved function block, and said first function block is responsive to said first unique address value when said first function block is operable and said second function block is responsive to said second unique address value when said first function block is not operable.

11. A serial communication control device as claimed in claim 6, further comprising:
an address holding means for keeping said first and said second unique address values set by said address setting means after start up of said serial communication control apparatus and wherein each of said first and said second function blocks comprise a serial command receiver for receiving said serial data from said CPU section and to read an address value, said serial command receiving comprising:
  a register; and
  a comparator for comparing said read address value with at least one of unique first and second address values and to store an associated data value in said register when said read address value coincides with one of said first and second unique values.

12. A serial communication control apparatus as claimed in claim 11, further comprising an address giving means, responsive to said CPU section, for giving said common address value to said address holding means upon start up of said serial communication control apparatus.

13. A serial communication control apparatus as claimed in claim 12, wherein said first function block is an active function block and said second function block is reserved function block and wherein said address holding means comprises:

said first and second comparators of said first and said second function blocks;

an address selector, wherein said address giving means gives said common address value to said first comparator and to said address selector to store the associated data value in said first register when said read address value coincides with said common address value.

14. A serial communication control apparatus as claimed in claim 13, wherein said address setting means sets said first and said second unique address values in said first and said second comparators to make said first and said second comparators store the associated data value of serial data in said first and second registers when said read address value coincides with said first and said second unique address values, respectively.

* * * * *

UNITED STATES PATENT AND TRADEMARK OFFICE
CERTIFICATE OF CORRECTION

PATENT NO.   : 5,678,056
DATED        : October 14, 1997
INVENTOR(S)  : Ikuya NAKAMURA It is certified that error(s) appears in the above-identified patent and that said Letters Patent is hereby corrected as shown below:

col. 1, line 22, delete "the".

col. 6, line 44, delete "values address" and insert --address values--.

Signed and Sealed this

Nineteenth Day of May, 1998

Attest:

BRUCE LEHMAN

*Attesting Officer*     Commissioner of Patents and Trademarks